July 11, 1950
R. V. L. HARTLEY
2,515,039
TRANSVERSE WAVE TRANSMISSION IN LIQUIDS
Filed Aug. 16, 1946
2 Sheets-Sheet 1
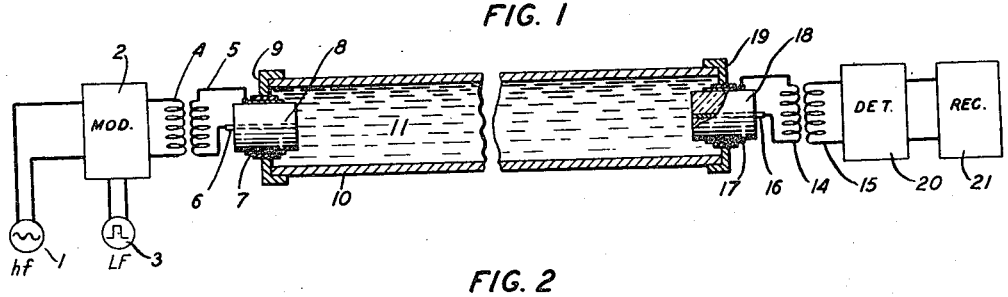
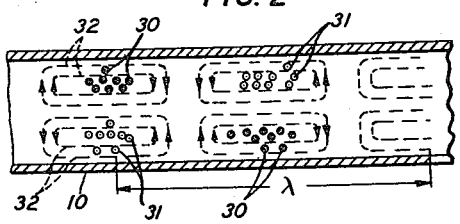
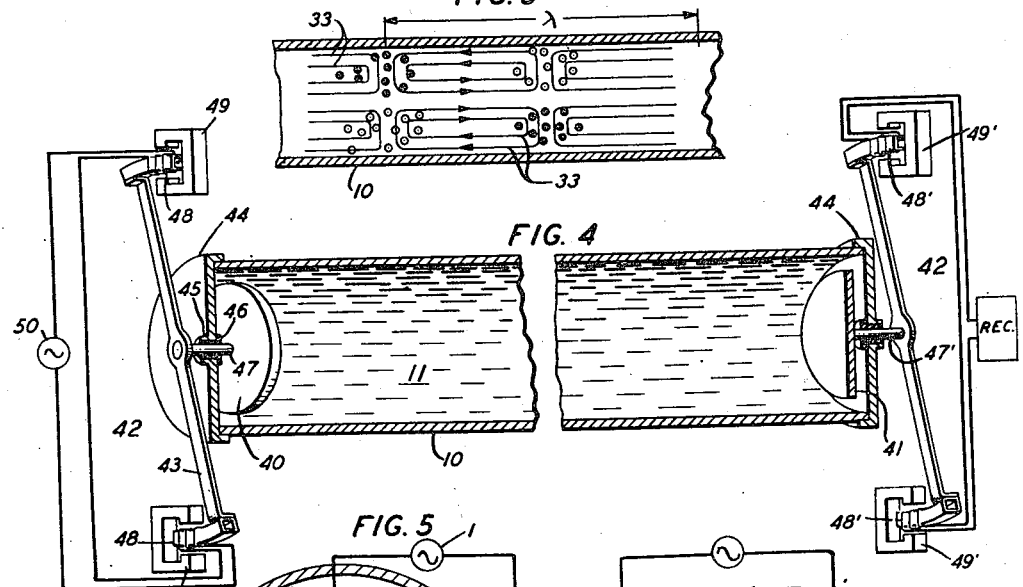
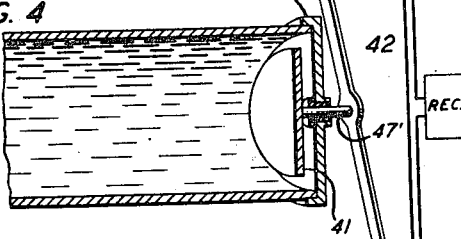
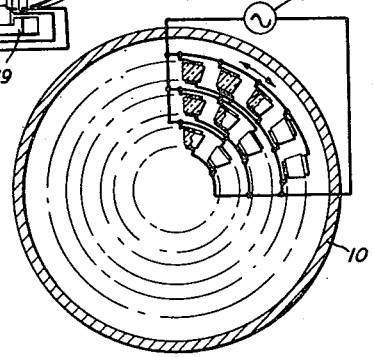
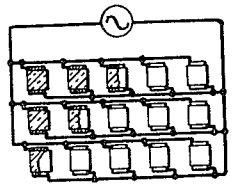
INVENTOR
R. V. L. HARTLEY
BY
*Harry C. Hart*
ATTORNEY July 11, 1950     R. V. L. HARTLEY     2,515,039
TRANSVERSE WAVE TRANSMISSION IN LIQUIDS
Filed Aug. 16, 1946     2 Sheets-Sheet 2

*INVENTOR*
*R. V. L. HARTLEY*
BY Harry C. Hart
*ATTORNEY*

Patented July 11, 1950

2,515,039

UNITED STATES PATENT OFFICE 2,515,039

TRANSVERSE WAVE TRANSMISSION IN LIQUIDS

Ralph V. L. Hartley, Summit, N. J., assignor to Bell Telephone Laboratories, Incorporated, New York, N. Y., a corporation of New York Application August 16, 1946, Serial No. 690,863

4 Claims. (Cl. 177—386)

This invention relates to wave transmission and particularly to the transmission of ultra-high frequency signals from a sending point to a receiving point by the propagation of a mechanical wave, derived from and related to the signal, through a fluid medium.

In the signaling art, it is known to transmit information from one point to another by launching a supersonic compression wave into a fluid medium. If the generating apparatus be correctly designed, in particular if its transverse dimensions be large in comparison with the wavelength of the propagated wave, its energy may be confined in a fairly narrow beam which may be directed toward a selected receiver, with consequent features of power economy and secrecy. However, the speed of propagation of sound waves in water, for example, is about 5,000 feet per second so that even at very high frequencies, the wavelength is several centimeters, which requires large and costly transmitting apparatus.

It is also known to obtain a desired time delay between the instant at which a signal appears at one part of an electric circuit and the instant at which it appears at another part of the circuit by introducing the signal, in the form of a traveling compression wave, into a delay device comprising a fluid compression wave guide. By reason of the high speed of propagation of compression waves in liquids and gases such devices require to be of great length where delays of more than a few thousandths of a second are to be obtained. This makes for cumbersome apparatus and for high attenuation of the propagated wave in its travel from the sending end of the guide to the receiving end.

It is among the objects of the present invention to reduc. the size of fluid mechanical wave generating apparatus; to reduce the length of a fluid delay line necessary to produce a given time delay, and to improve the secrecy of communication by signaling through fluid media. These and other objects are attained, in accordance with the invention, by the use of transverse fluid waves as distinguished from longitudinal or compressional waves. The low propagation velocity of transverse liquid waves (of the order of 10 to 100 meters per second in representative suitable liquids) results in much shorter wavelengths, for given frequencies, than are characteristic of compressional waves. This permits the use of generating apparatus of smaller transverse dimensions for a given index of directivity and of physically shorter delay lines for a given time delay.

In accordance with the invention the transverse waves, whether rectilinear or torsional in character, may be launched into the transverse wave-supporting fluid by the application of shearing forces, applied to a suitable fluid boundary surface, for example, the surface in contact with the face of a suitable transverse driver element. The latter may be of any desired type, electromagnetic or piezoelectric transducer apparatus designed for transverse or torsional movements being preferred, especially at the high frequencies contemplated.

It is to be noted that transverse waves or vibrations as a class fall naturally into two subclasses, namely rectilinear or straight transverse waves or vibrations and circular transverse waves or vibrations. From the standpoint of a single molecule or filament of the liquid, or a single elementary volume thereof, there is no difference between these two subclasses. From the standpoint of a much larger volume of liquid, such, for example, as the whole volume included within a transverse wave guide, there is a substantial difference. In the latter case, stream lines or lines of equal particle velocity are circles, lying symmetrically about a central axis parallel with the direction of wave propagation. In the former case, the lines of equal velocity are straight lines, normal to the direction of propagation, and all liquid particles which at a given instant lie in a single plane normal to the direction of propagation or "ray" are moving in the same direction.

The normal characteristics of density, elasticity and viscosity differ widely among the various liquids and gases as do also certain small scale molecular or atomic characteristics to which reference is made hereafter. These various characteristics determine in large part the response of the fluid to applied shearing forces and therefore determine the propagation of transverse and torsional waves. The viscosity in particular is generally dependent on the temperature and may increase or decrease with the temperature depending on the particular liquid employed. The thermal movement of the individual molecules in the fluid, which may play a part, increases with temperature. The atomic spins and magnetic moments which may also play a part are influenced by magnetic fields. Therefore by control of the temperature and other factors which influence the fluid characteristics, it is possible to control the phenomena under consideration over comparatively wide ranges.

Solutions of certain substances of high molecular weight, notably the high polymers, in solvents with which they are miscible in all proportions, grade uniformly from viscous liquids through gelatinous or rubber-like consistencies to plastic solids. Substances having these characteristics have been found to be suitable for the propagation of transverse waves. Therefore, the terms "liquid" and "fluid" as employed in this specification are used to denote the physical character of the particular medium under the particular conditions of use. They are not to be taken as indicating a particular chemical substance or a pure substance, or a mixture or solution which under some standard conditions behaves in a particular fashion. Thus, for example, the term "liquid" as used in this specification includes tar, molasses, polyisobutylene, dimethyl silicone putty, and the like. (The last-named substance forms the subject-matter of application Serial No. 569,647 of J. G. E. Wright, filed December 23, 1944.)

The invention will be more fully understood from the following detailed description of certain preferred embodiments thereof, taken in connection with the appended drawings in which:

Fig. 1 is a schematic diagram, partly in section, of a time delay unit in accordance with the invention including a torsional liquid wave guide, and provided with piezoelectric driver and pickup elements;

Fig. 2 is a diagram of a portion of the guide of Fig. 1 showing the distribution of particle velocities and vorticity lines in a liquid torsional wave;

Fig. 3 is a diagram showing the distribution in the wave guide of Fig. 1 of particle velocities and of lines of angular displacement of a liquid filament in the course of propagation of torsional waves;

Fig. 4 is a sectional diagram of a torsional wave guide similar to that of Fig. 1 but provided with electromechanical driver and receiver elements as alternatives for the piezoelectric elements of Fig. 1;

Fig. 5 is a diagram showing a circular array of piezoelectric crystal elements arranged for the application of torsional shearing forces to a transverse wave-supporting liquid medium;

Fig. 6 is a diagram showing an array of piezoelectric crystal elements arranged for the application of rectilinear shearing forces to a transverse wave-supporting liquid medium;

Figure 8:
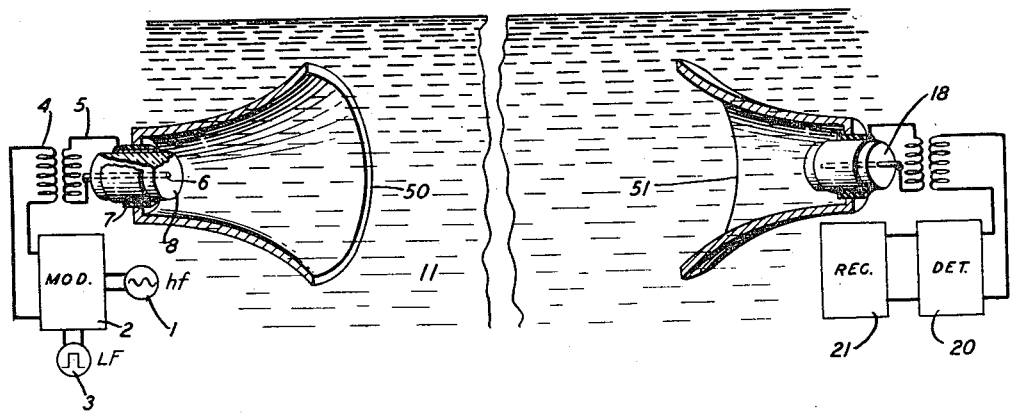
Fig. 8 is a schematic diagram showing apparatus for launching a torsional transverse wave into unconfined medium at one point and for picking up and receiving the propagated wave at another point.

Referring now to Fig. 1 in which the circuit connections are exemplary only, a generator 1 of high frequency oscillations supplies its energy to a modulator 2. The modulator modulates the amplitude of the high frequency oscillations at a lower frequency derived, for example, from a low frequency pulse generator 3. The high frequency oscillations thus modulated are passed by way of a transformer whose primary winding 4 is connected to the modulator 2 and whose secondary winding 5 is connected to suitably located electrodes 6, 7 of a torsional piezoelectric element 8, mounted centrally in an end cap 9, which closes the head or driving end of a wave guide 10. The wave guide itself may comprise a tube of any suitable material such as steel, and is filled with a torsional wave supporting liquid 11 such as polyisobutylene or dimethyl silicone putty. A receiving piezoelectric element 18 which may be identical with the transmitting element, is similarly mounted in an end cap 19 which closes the far or receiving end of the wave guide tube 10. The primary winding 14 of an output transformer is connected to the suitably located electrodes 16, 17 of the output piezoelectric element 18. The secondary winding 15 of this transformer is connected to a detector 20 which is in turn connected to a receiver or load 21.

The piezoelectric elements 8, 18 are designed principally for torsional vibrations about their axes, and preferably for a minimum of motion parallel or transverse to their axes. Such torsional piezoelectric elements are well known. For example, each of these elements may comprise a Rochelle salt crystal, cut into the form of a cylinder with its geometrical axis of symmetry coincident with the crystal optical axis, a central axial hole being drilled lengthwise of the crystal. In the element 8, for example, a rod-shaped electrode 6 is placed in this hole and another electrode 7 in the form of an equatorial belt of metal foil or gauze extends around the crystal forming a loop thereabout in a plane normal to the long dimension of the internal electrode. With this construction, if charges of opposite sign be placed on the two electrodes, torsional deformations of the crystal result, the effect of which is to cause a rotation of one end of the crystal with respect to the other end thereof in a plane normal to the central or optical axis. Such a torsional crystal is described and shown in Nicholson Patent 1,766,044, June 24, 1930.

The crystals are centrally mounted in such a way that the rotational inertia of the inner portion, which is in contact with the liquid, is balanced by that of the outer portion which is external to the wave guide. Such a mounting permits greater freedom of torsional vibration of the crystal and reduced damping. Other mountings may equally well be employed, for example, the crystal may be supported entirely within the liquid, wave propagation from the rear end being prevented by an equatorial septum or screen in the manner shown and described in application Serial No. 690,870 of W. P. Mason, filed August 16, 1946, issued December 6, 1949, as Patent No. 2,409,452. Or, one end of the crystal may be firmly fixed as by cementing to a rigid end wall of the wave guide, in which case the whole of its rotational movement may be utilized.

In any case the piezoelectric crystal element should be so dimensioned that its natural resonant frequency for torsional vibrations lies in the frequency range at which operation is desired. Thus torsional oscillations of substantial amplitude are engendered and maintained.

In operation, high frequency oscillatory energy from the oscillator 1, modulated at a lower frequency derived from the oscillator 3, is fed by way of the transformer windings 4, 5 to the torsional crystal 8. The frequency of the high frequency oscillator 1, is preferably adjusted in well-known manner to coincide approximately with the natural frequency of vibration of the crystal 8. The resulting application of electric charges, which alternate in sign at the high frequency, to the inner and outer electrodes 6, 7 of the piezoelectric crystal 8 results in an alternating rotational movement or twist of the crystal as a whole. Because of frictional drag between the cylindrical and end surfaces of the crystal and the liquid medium 11, the liquid film which is in contact with the crystal faces is subjected to shearing forces, and participates in the movement of the crystal surfaces and therefore undergoes an alternating torsional displacement and velocity.

It has been found that this torsional movement of the first film of the liquid in contact with the crystal face is propagated in the form of a torsional liquid wave axially lengthwise down the tube 10 from the driving end to the receiving end. There it exerts an alternating twist on the front and cylindrical faces of the receiving crystal 18 and imparts an alternating rotary movement thereto which gives rise to electric charges on the electrodes 16, 17 of the receiving crystal and produces a corresponding electric current in the primary winding 14 of the transformer in well-known manner. In the absence of non-linear distortion in the propagation of the torsional waves along the tube, this current consists of high frequency oscillations modulated at a lower frequency. The high frequencies may be removed by the detector 20 leaving low frequency pulses which are then fed to a receiver or load 21 and utilized in any desired manner.

The movement of the liquid 11 is zero on the axis of the guide, i. e., on the prolongation of the crystal twist axis. It increases to a maximum value at a radius approximately equal to the peripheral radius of the crystal, and falls again to zero at the tube wall, where viscous drag between the wall and the liquid film in contact with the wall prevents all motion of that liquid film. In order not to require too rapid a transition from the maximum displacement and velocity at the periphery of the crystal to the zero value at the tube wall, the diameter of the crystal 8 is preferably from 0.6 to 0.8 the inner diameter of the wave guide tube 10. With this relation the radial distribution of particle displacements and velocities is approximately that of the first order Bessel function, or a sum of such functions, i. e., the circuital velocity at all points of the liquid 11 may be represented by $$v_\theta = \sum K_m J_1\left(\frac{a_m r}{r_0}\right) \epsilon^{-a_m x} \cos \omega\left(t - \frac{x}{v_m}\right) \quad (1)$$

where $J_1(x)$ is the first order Bessel function,
$r_0$ is the inside radius of the guide,
$r$ is the radius, within the liquid, measured from the axis,
$x$ is axial distance along the guide,
$\omega$ is the angular operating frequency,
$m$ is a mode number,
$a_m$ is the modular constant, i. e., the $m$th root of $J_1(x) = 0$,
$v_m$ is the velocity of propagation in the liquid in the guide for the $m$th mode and the angular operating frequency.
$a_m$ is an attenuation factor for the $m$th mode, and
$K_m$ is a constant.

In the course of the propagation of the torsional waves and at a given instant of time, the circuital particle velocities, the resulting vorticity, and the angular displacements of a filament parallel with the wave guide tube axis, all take on a certain distribution dependent on the frequency of the applied shearing force signal. These are shown in Figs. 2 and 3 for the simplest modal distribution and for a sinusoidal applied driving frequency whose guided wavelength in the liquid is approximately twice the diameter of the guide as indicated in the figures. The solid circles 30 indicate velocity stream lines into the paper and the open circles 31 indicate velocity stream lines outward of the paper. The broken elliptical lines 32 of Fig. 2 represent lines of vorticity which surround the annular region of flow. Evidently, the angular displacement of a filament of liquid parallel with the central axis is in quadrature with the vorticity and the velocity. The lines of angular displacement 30, at a particular instant, are therefore spaced along the axis from the vorticity lines 32 by a quarter wavelength, as indicated by the full lines 33 in Fig. 3.

This distribution of velocity, vorticity, and angular displacement are the same as the distribution of electric field strength, time rate of change of magnetic displacement, and magnetic displacement, respectively, in a guided dielectric wave of the transverse electric type as described, for example, in United States Patent 2,147,717, February 21, 1939, to S. A. Schelkunoff, and in "Electromagnetic Waves" by S. A. Schelkunoff (Van Nostrand, 1943). As with the dielectric wave guide, the driving frequency must exceed a certain critical value determined for each mode by the diameter of the guide and the wave velocity in an unconfined medium. Above the critical frequency the apparent phase velocity along the wave guide decreases with increasing frequency.

For best results it is desirable to select the operating frequency above the cut-off frequency for the lowest order mode and below the cut-off for the mode of the next higher order; or, the frequency being determined by other considerations, to adjust the guide dimensions accordingly. For a circular cross-section guide of radius $r_0$, the cut-off frequency for the lowest order mode is given by $$\omega_c = 2\pi f_c = \frac{3.83 v}{r_0} \quad (2)$$

where $v$ is the propagation velocity in an unconfined medium; or $$2r_0 = \frac{3.83 \lambda}{\pi} \quad (3)$$

where $\lambda$ is the wavelength in the unconfined medium at the frequency in question not to be confused with the guided wavelength indicated in Figs. 2 and 3. For the next higher mode, the corresponding formulae are $$\omega_c = 2\pi f_c = \frac{7.02 v}{r_0} \quad (4)$$

$$2r_0 = \frac{7.02 \lambda}{\pi} \quad (5)$$

Thus there is a frequency range of nearly two to one, or nearly one octave, in which only the lowest order mode can be propagated. Mathematically, operation in this manner corresponds to reducing the series (1) to its first term.

Fig. 4 shows a modification of Fig. 1 in which the piezoelectric driving and pick-up elements of Fig. 1 are replaced by mechanically rotatable disks 40, 41 adapted to be driven by or to drive electromagnetic driving and pick-up units 42, 42' respectively. In this case the guide 10 may be entirely closed except for a central hole 45 in the face of each end cap 44, through glands or stuffing boxes 46 in which there protrude torsional drive shafts 47 and 47' respectively on the inner ends of which are mounted disks 40 and 41 respectively. The diameter of the disks 40 and 41 should be from 0.6 to 0.8 of the inside diameter of the wave guide tube 10. Outside of the tube the drive shaft 47 may be torsionally oscillated in any convenient manner, for example, by the electromagnetic oscillating device 42 comprising a cross shaft 43 fixed to the outer end of the drive shaft 47 and bearing at each end thereof a small coil winding 48 whose axis lies approximately on a circle concentric with the drive shaft 47. Two permanent magnets 49 may be disposed so that the coils 48 lie snugly in their air-gaps. Application of alternating current to the windings, derived, for example, from a modulator such as that of Fig. 1 or from an alternating current generator 50 of any suitable type, causes alternating movement of the coils 48 inward and outward of the magnet air-gaps and, therefore, alternating rotary motion of the driving disk 40. A substantially similar arrangement may be provided at the output end of the guide, so that torsional movements of the liquid film in contact with the disk 40 propagated from end to end of the wave guide 10 through the liquid medium 11 impart rotary movements to the disk 41 and therefore to the shaft 47' causing movements of the windings 48' within the magnet air-gaps which, in turn, generate electric signals which may be amplified, detected, received and utilized in well-known fashion.

Various other devices may be employed to impart rotary or torsional movements to the liquid in the guide. Since a twisting force around a circle may be regarded as the summation of a series of shearing forces acting along elements of the circle, an array of crystal elements cut and connected to vibrate in a shear mode and arranged in a circle will provide a torsional shearing force of the sort required. A driving unit so constructed is schematically indicated in Fig. 5, where each of several concentric circles is composed of a plurality of shear mode crystals. The crystals may be of various materials, of various cuts, and connected in various ways. For example, a Y-cut quartz crystal, with the voltage applied along the Y axis, vibrates in shear along the X axis. With such an arrangement, all the crystals, being first provided with conductive films on both faces to serve as electrodes, may be cemented to a backing plate in the circular arrangement of Fig. 5, and the driving voltage applied to all the crystals in parallel between the backing plate and the front face electrode. At still higher frequencies quartz crystals of AT or BT cut may be employed. At lower frequencies, Z-cut crystals of ammonium dry hydrogen phosphate the voltage being applied along the crystal Z axis, vibrate in shear along the crystal Y axis. Thus, if they are mounted with their X axes parallel with the axis of the guide, their Z axes along radii, and their Y axes aligned with circles concentric with the guide, and are provided with electrode platings on their faces normal to the radial Z axes, they will vibrate as desired and apply a twisting force to the liquid in contact with their X faces. This arrangement, together with the electric connections, is schematically indicated in Fig. 5, where all positive electrodes are connected together and all negative electrodes are connected together, the positive leads being connected to one terminal of a source 1 and the negative leads to the other. Still other torsional arrangements may be employed, for example, composite Rochelle salt crystal arrangements such as are shown in Nicholson Patent 1,737,019. Any of these crystal arrangements is equally suitable for use as a torsion wave receiver at the distant end of the guide.

Figure 7:
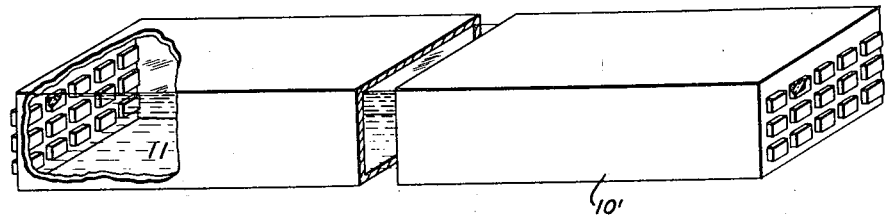
Fig. 7 is a perspective diagrammatic view of a transverse wave guide of rectangular cross-section for use with a liquid rectilinear transverse wave-supporting medium and provided with driver elements and pick-up elements arranged similarly to Fig. 6.

Fig. 7 is a schematic perspective view of a rectangular cross section wave guide adapted to support rectilinear transverse liquid waves. To launch such waves, it is necessary to impart a transverse or shearing motion to a film of the liquid at the head or driving end of the guide. For this purpose, a rectangular array of piezoelectric crystal elements may be employed, as illustrated schematically in Fig. 6. The crystals should be cut, mounted, and provided with electrodes in such fashion that when alternating charges are applied to their electrodes the outer end faces undergo a lateral translation in a plane normal to the axis of the wave guide. The crystals of such an array may be the same in construction and operation as those of the circular array of Fig. 5 with the exception that the crystals are oriented so that their mechanical axes lie in parallel straight lines instead of lying in concentric circles, and electrode arrangements suitable for Z cut quartz crystals are indicated in the figure. However, any of the crystal cuts described above in connection with Fig. 5 are equally suitable when oriented as in Fig. 6, and similar arrays of transversely vibrating crystals may be employed as the pick-up device for Fig. 7. In Fig. 7 the interconnections among the crystal elements, which are known per se, are omitted for the sake of simplicity. The external circuits both at the driving end and at the receiving end may be of any desired type and may, for example, take the form of the circuits shown in Fig. 1.

The rectilinear transverse vibration of the liquid in a guide 10' such as that of Fig. 7, imparted by the shearing forces of a driver such as that of Fig. 6, results in movement of liquid particles toward and away from two oppositely located walls of the guide, say the vertical walls of Fig. 7. To prevent the formation of undesired compression waves on reflection of this movement at the guide walls, it is desirable that the walls present to the liquid an impedance which is as low as possible for compression waves. The liquid should be free to vibrate laterally as nearly as possible as though it were unconfined. To this end the interior surfaces of the guide walls which are normal to the direction of vibration may be lined with a layer of paper, sponge rubber, or other substance in which quantities of air are entrapped in cells or pockets or in the interstices of a matted fibre. When the surface tension of the liquid is such that it does not wet the inside walls, an etched or ground surface of metal or other hard material entraps minute quantities of air in sufficient quantities to serve the purpose. If the latter is employed, the grain of the interior surface should be of a suitable fineness, as compared with the wavelength of the liquid vibrations, in order to avoid setting up diffraction patterns. A liquid compression wave guide having these features is described and claimed in H. J. McSkimin application Serial No. 653,255, filed March 9, 1946, and issued April 25, 1950, as Patent 2,505,364. It is of no great importance whether the walls which lie parallel to the direction of liquid vibration be provided with any special surface or finish or not, because the impedance to shearing forces of walls having a special surface finish is not noticeably different from the impedance of smooth hard walls. Therefore all the interior walls of the guide may be similarly treated.

Figure 7A:
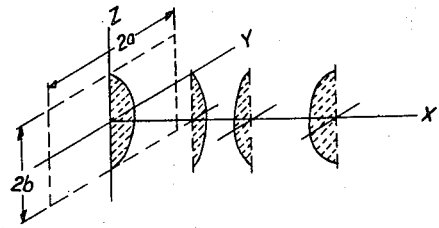
Fig. 7a is a diagram representing the distribution of fluid particle velocities of a rectilinear transverse wave in the guide of Fig. 7.

The distribution of particle velocities, in a rectilinear transverse guide such as that of Fig. 7, over a plane normal to the direction of propagation is indicated in Fig. 7a. With the axes taken as indicated, X being the direction of propagation and Y the direction of crystal shear and liquid vibration, the velocity is entirely in the Y direction, is zero at the walls which are parallel to the X—Y plane and, for the simplest mode, is a maximum in the plane midway between these walls, being cosinusoidally distributed between the walls. It is independent of distance from the axis in the Y direction. Therefore the propagated wave may be represented by the formula $$V_y = \sum \left[ A_m \cos \frac{m\pi z}{2b} + B_m \sin \frac{m\pi z}{2b} \right] \epsilon^{-\alpha_m x} \cos \omega \left( t - \frac{x}{v_m} \right) \quad (6)$$

where $m$ is an odd integer in the cosine terms and an even integer in the sine terms, $v_m$ is the phase speed in the guide, $\alpha_m$ is the attenuation constant, $2a$ and $2b$ are the lengths of the sides of the cross section as indicated in Figs. 7a, and $A_m$ and $B_m$ are constants. In the simplest mode, $m=1$, and $B_m = B_1 = 0$ so that the expression reduces to $$V_{y1} = A \cos \frac{\pi z}{2b} \epsilon^{-\alpha x} \cos \omega \left( t - \frac{x}{v_1} \right) \quad (7)$$

where $v_1$ is the phase speed in the simplest mode.

The cut-off frequency and the corresponding wavelength for this simplest or lowest mode are given by $$\omega_c = 2\pi f_c = \frac{\pi v}{2b} \quad (8)$$

$$\lambda_c = 4b$$

where $2b$ is the length of the side of the cross-section which lies in a plane normal to the direction of the liquid particle velocity.

The invention is not limited to the transmission of guided waves. Particularly if high signalling frequencies are employed, a sharp narrow beam of transverse radiation may be propagated through an unconfined medium. Fig. 8 represents such a system schematically for torsional waves in which the electromechanical transducers at a transmitting station and at a receiving station are piezoelectric crystal elements which may be similar to those of Fig. 1, Fig. 4 or Fig. 5. The driver of Fig. 1 is shown by way of example and for the sake of simplicity. The associated electric circuits may be similar to those of Fig. 1 and may operate in similar fashion. For impedance matching purposes, the driving piezoelectric elements may be mounted at the throat of a horn 50 which may be designed to effect an optimum transfer of energy from the torsionally vibrating crystal to the torsion wave supporting medium. Wave energy may be collected after propagation to a remote point by a similar horn 51 and thereby concentrated on the face of the receiving crystal 18 where it may deliver shearing forces to the receiving crystal which give rise, in turn, to a signal current in the output circuit and ultimately to a desired signal in a receiver 21.

If preferred, rectilinear transverse waves may be radiated, flaring horns of rectangular cross-section being employed in place of the circular section horns of Fig. 8. The driving and receiving elements may be mounted in the throats of the horns, or if a large array of crystals be employed, directivity of radiation results without more, and the horns may be dispensed with.

The molecular mechanism by which transverse wave energy, originating in a lateral drag at the surface of a shearing element, is propagated from each fluid film or layer to the next, is not fully known. According to one theory the mechanism is substantially the same as that by which a transverse wave may be propagated through an elastic solid by reason of its rigidity or shear modulus, the main difference being that such effects are usually masked at low frequencies by the effects of viscosity. According to another theory, each liquid molecule has associated with it a certain rotary inertia which may have its origin in the spins of the atoms and electrons out of which the molecule is built, or in the thermal energy of movement of the liquid particles themselves. Whether the true explanation be a solid-like rigidity or a rotational stiffness of the fluid particles themselves, the results are much the same, and no attempt is made in this specification to distinguish between one theory and another or to base the invention on one or other mode of molecular coupling. The propagation has been observed in some fluids, notably the very viscous liquids, and it may exist in other fluids.

The feature which is common to liquids which are particularly well suited to the propagation of transverse waves is that their viscosities are higher, by several orders of magnitude, than the viscosity of water. Indeed, if a test tube is filled with one of these liquids at room temperature and left standing until it reaches equilibrium and then tipped over on to its side, it requires several minutes or hours before any of the liquid spills out.

Figure 9:
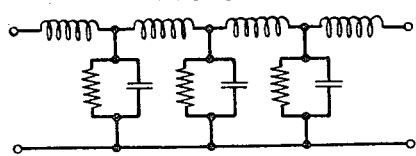
Fig. 9 is an electric circuit diagram of a system which is analytically equivalent to a high viscosity transverse wave supporting fluid.

It appears, therefore, that the electric transmission line circuit analogue of the transverse wave-supporting medium is as indicated in Fig. 9 and consists of series inductance elements and shunt capacitance elements and resistance elements. In this equivalent circuit, the inductance elements represent the effects of the masses of the fluid particles or the density of the liquid, the shunt resistances represent the effects of the liquid viscosity, and the shunt condensers represent the effects of the liquid rigidity or stiffness associated with rotational inertia as the case may be. That capacitances may represent the effects of rotational inertia should cause no surprise when it is recalled that under certain conditions a gyroscope behaves like a spring.

It will be recognized from the equivalent circuit of Fig. 9 that the higher the values of the shunt resistances, the more nearly the transmission line composed of the inductance elements and capacitance elements behaves like a non-dissipative transmission line, and the lower the frequency at which propagation can take place, i. e., the lower the cut-off frequency of the line. Similarly, it is an experimental fact that, in the cases of all fluids thus far investigated, the higher the viscosity the lower the cut-off frequency for the propagation of transverse waves. For successful operation, therefore, the operating frequency should be above cut off for the medium itself, as well as being above cut off for the guide.

What is claimed is:

1. Apparatus for the transmission of signals which comprises a rigid supporting conduit, a plastic material substantially filling said conduit, said material having so extremely high a viscosity that the material is capable of undergoing rapid minute intermolecular displacements but incapable of undergoing rapid substantially greater displacements between adjacent portions thereof, whereby transverse waves may be propagated through the body of the material, means at one end of said conduit for applying a shearing force to a layer of said material in a plane normal to the axis of the conduit and in a sense to launch such transverse waves into the body of said material, and means at the other end of said conduit for receiving said transverse waves propagated through the body of said material.

2. Apparatus as defined in claim 1 wherein the conduit is a cylinder of circular cross section and wherein the shearing-force-applying means comprises a torsional vibrator whose axis of rotation is parallel with the cylindrical axis of the conduit.

3. Apparatus as defined in claim 1 wherein the conduit is of rectangular cross section having two oppositely located low impedance walls and wherein the shearing-force-applying means comprises an element having a face lying in a plane normal to the axis of the conduit and arranged to vibrate rectilinearly in said plane and in a direction normal to the planes of said walls.

4. Apparatus as defined in claim 1 wherein the conduit is a cylinder of circular cross section and wherein the shearing-force-applying means comprises a circular array of vibrator elements arranged coaxially with the conduit and wherein each element is arranged to vibrate in a plane parallel to the plane of the conduit cross section and in a direction normal to the conduit axis.

RALPH V. L. HARTLEY.

REFERENCES CITED

The following references are of record in the file of this patent:

UNITED STATES PATENTS

| Number | Name | Date |
| --- | --- | --- |
| 1,799,634 | Norton | Apr. 7, 1931 |
| 2,147,717 | Schelkunoff | Feb. 21, 1939 |
| 2,207,845 | Wolff | July 16, 1940 |
| 2,403,214 | Fiddler | July 2, 1946 |
| 2,421,026 | Hall et al. | May 27, 1947 |
| 2,427,348 | Bond et al. | Sept. 16, 1947 |